United States Patent
Ueda

[11] Patent Number: 5,339,402
[45] Date of Patent: Aug. 16, 1994

[54] SYSTEM FOR CONNECTING AN IC MEMORY CARD TO A CENTRAL PROCESSING UNIT OF A COMPUTER

[76] Inventor: Tetsushi Ueda, c/o Showakojo, Rhythm Watch Co., Ltd. 496 Obusuma, Showa-machi, Saitama-Pref., Japan

[21] Appl. No.: 920,912
[22] Filed: Jul. 28, 1992
[51] Int. Cl.5 .............................. G06F 12/00
[52] U.S. Cl. .................... 395/425; 395/325; 395/400; 235/492; 364/DIG. 1
[58] Field of Search ........... 395/325, 425, 400; 371/40.2; 235/492

[56] References Cited

U.S. PATENT DOCUMENTS

| | | | |
|---|---|---|---|
| 3,962,684 | 6/1976 | Caudel et al. | 395/325 |
| 4,263,650 | 4/1981 | Bennett et al. | 395/325 |
| 4,291,370 | 9/1981 | Charles | 395/325 |
| 4,649,511 | 3/1987 | Gdula | 395/325 |
| 4,831,514 | 5/1989 | Turlakov et al. | 395/325 |
| 4,888,773 | 12/1989 | Arlington et al. | 371/40.2 |
| 4,902,146 | 2/1990 | Ishikawa | 400/61 |
| 4,979,144 | 12/1990 | Mizuta | 395/425 |
| 5,055,661 | 10/1991 | Gochi | 235/492 |
| 5,091,909 | 2/1992 | Kishiro et al. | 371/40.1 |
| 5,119,486 | 6/1992 | Albonesi | 395/425 |
| 5,125,409 | 6/1992 | Kajino et al. | 128/660.07 |
| 5,133,480 | 7/1992 | Matsumoto et al. | 222/2 |
| 5,260,555 | 11/1993 | Sakamoto | 235/492 |

Primary Examiner—Allen R. MacDonald
Assistant Examiner—Ayaz R. Sheikh
Attorney, Agent, or Firm—John T. Roberts

[57] ABSTRACT

An address storing device is provided for storing segment addresses based on data applied from a CPU. An IC memory card set in a computer is addressed with a low-order 8 bits address applied from the CPU. In accordance with a memory request signal and a read/write signal from the CPU, a chip enable signal, and a data enable signal are applied to the IC memory card, thereby reading data stored in the IC memory card by the CPU.

20 Claims, 3 Drawing Sheets

SYSTEM FOR CONNECTING AN IC MEMORY CARD TO A CENTRAL PROCESSING UNIT OF A COMPUTER

BACKGROUND OF THE INVENTION

The present invention relates to a system for operatively connecting an IC memory card to a central processing unit (CPU) of a computer for reading data in the card and writing data in the card.

Floppy disks and IC memory cards have come to be generally used as external supplementary memories for storing data such as programs for operating the computer. The data stored in the supplementary memories are usually written in a main memory of the computer through an input/output interface in accordance with a loading instruction from the CPU. Thereafter the CPU operates in accordance with the program data stored in the main memory.

In other words, the CPU executes the program after the program data are transferred to the main memory. Since it takes some time for writing data in the main memory, the starting of the execution of the CPU is delayed. In addition, the amount of operations of the CPU are increased, causing an increase of power consumption and fatigue of the computer.

SUMMARY OF THE INVENTION

An object of the present invention is to provide a system for connecting an IC memory card to a CPU of a computer wherein the IC memory is directly accessible by the CPU, thereby eliminating the above described disadvantages in the prior art.

According to the present invention, there is provided a system for connecting an IC memory card to a central processing unit (CPU) of a computer comprising, detector means for detecting setting of the IC memory card in the computer, designating means responsive to an instruction for generating a device designating signal, address storing means responsive to the device designating signal for storing segment addresses based on data applied from the CPU, addressing means for addressing the IC memory card with a low-order 8 bits address applied from the CPU and for addressing the IC memory card with an address obtained by adding low-order 8 bits of the segment address applied from the address storing means to high-order 8 bits of an address applied from the CPU, and converter means responsive to an instruction from the CPU for generating a memory read signal and a memory write signal.

The system has further operation control means responsive to the device designating signal for producing an operation control signal, control signal generator means responsive to an instruction from the CPU and to the operation control signal for applying a chip enable signal, a data enable signal and a write signal dependent on the memory read signal and memory write signal to the IC memory card, data buffer means for performing a bidirectional transmission of data between the IC memory card and the CPU, and power supply means for supplying electric energy to the IC memory card.

In an aspect of the invention, the instructions applied from the CPU to the designating means and control signal generator means are signals selected from the address signals of the CPU, and the instruction applied to the converter means are a memory request signal and a read/write signal of the CPU.

These and other objects and features of the present invention will become more apparent from the following detailed description with reference to the accompanying drawings.

DETAILED DESCRIPTION OF THE PREFERRED EMBODIMENT

Figure 1:
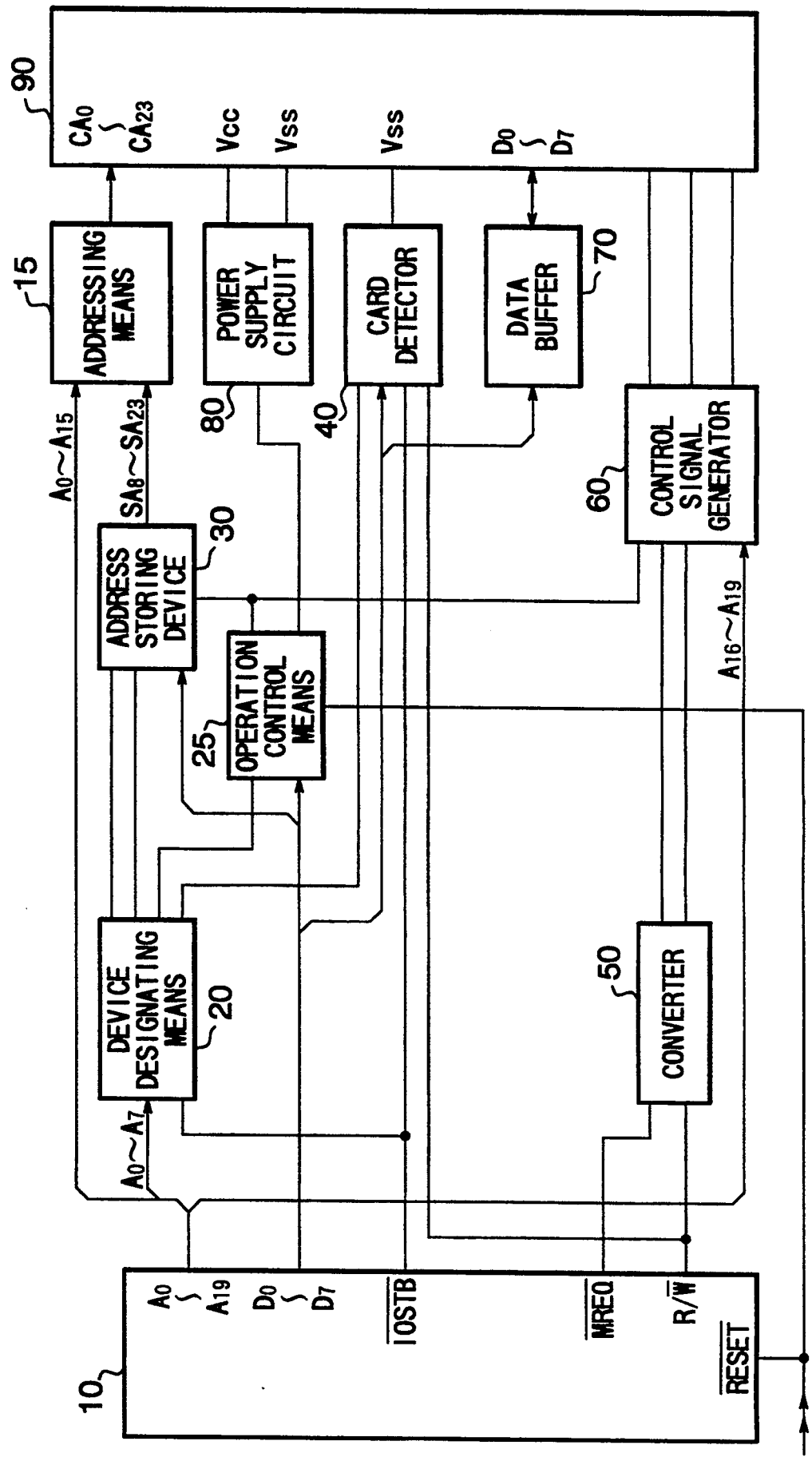
FIG. 1 a block diagram of a system for connecting an IC memory card to a CPU of a computer in accordance with the present invention.

Referring to FIG. 1, an IC memory card (hereinafter called memory card) 90 having a capacity of 64 kilobytes is plugged into a computer having a central processing unit (CPU) 10. The system of the present invention has an addressing means 15 to be connected to an address bus of the CPU 10 and to address terminals of the memory card 90, a device designating means 20 and a control signal generator 60 which are also connected to the address bus, an operation control means 25 and a data buffer 70 which are connected to a data bus of the CPU.

Address signals from the CPU 10 are applied through the address bus to the addressing means 15 which operates to designate a card address of the memory card 90 in accordance with the address signal so that an access to the memory card 90 is obtained. Outputs of the device designating means 20 are connected to an address storing device 30 which applies signals to address the card to the addressing means 15. The control signal generator 60 controls the operation of the system, namely, reading data from and writing data in the memory card 90.

The data buffer 70 is connected to the memory card 90 so as to enable a bidirectional transmission of data signal between the CPU 10 and the memory card 90. The data bus is further connected to the address storing device 30 and a card detector 40.

A strobe signal terminal $\overline{IOSTB}$ of the CPU 10 is connected to the device designating means 20 and the card detector 40 to apply an IO strobe signal IOSTB for controlling the operating timings thereof. A memory request signal terminal $\overline{MREQ}$ and a read/write signal terminal $R/\overline{W}$ are connected to a converter 50 which is connected to the control signal generator 60. The read/write signal terminal is further connected to the card detector 40. The CPU 10 sends a reset signal $\overline{RESET}$ to the operation control means 25 for resetting the system.

Figure 2:
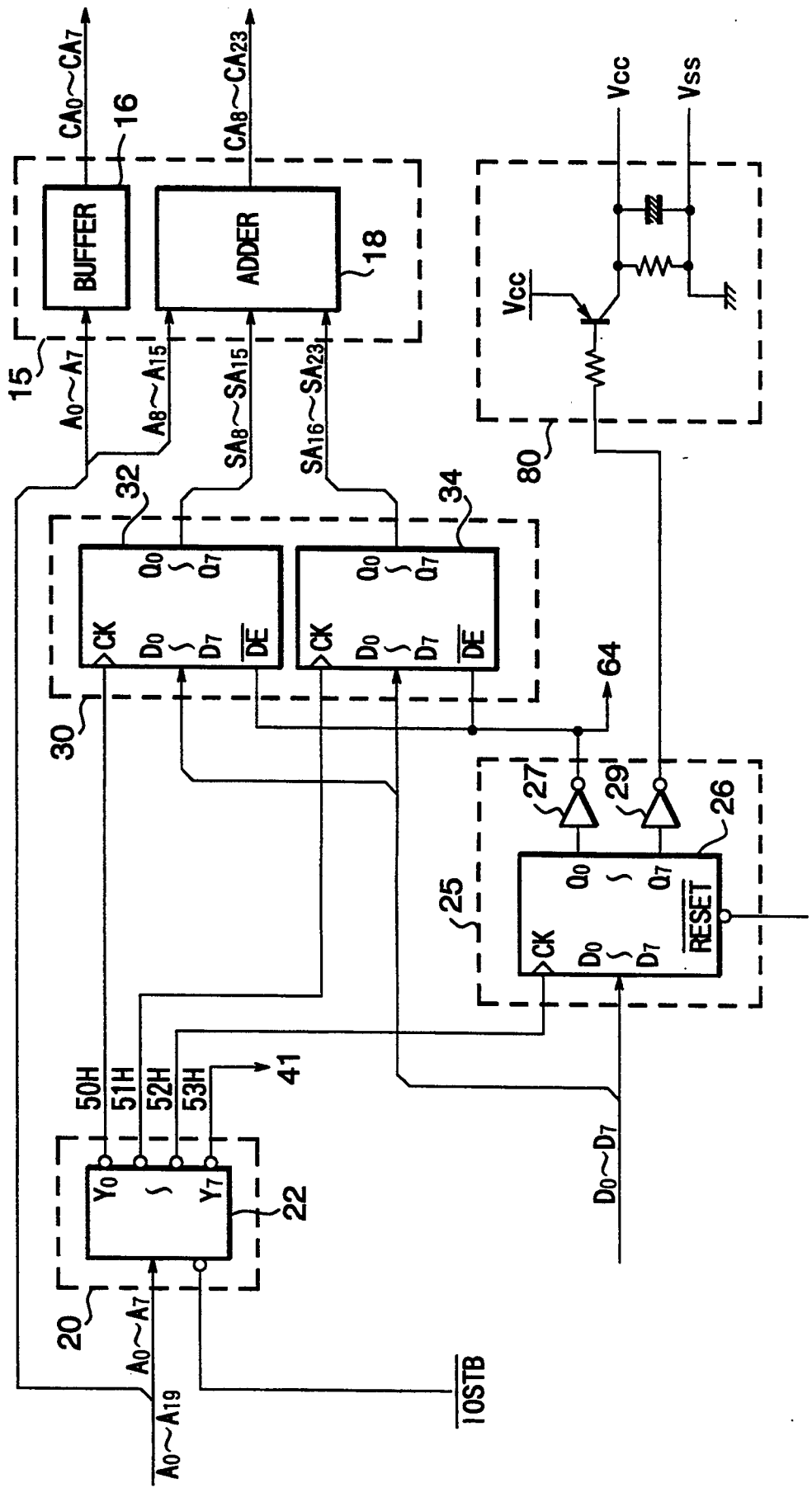
FIG. 2 is a block diagram showing a part of the connecting system of FIG. 1.

Referring to FIG. 2, the device designating means 20 comprises an IO decoder 22. Outputs of the device designating means 20 are connected to a first address buffer 32, a second address buffer 34, operation control means 25, and card detector 40, respectively. The first address buffer 32 is adapted to store low-order 8 bits $SA_8$ to $SA_{15}$ of segment addresses as high-order byte data for the card addresses $CA_8$ to $CA_{23}$, and the second address buffer 34 is adapted to store high-order 8-bits $SA_{16}$ to $SA_{23}$ of segment addresses as segment data for the card address as described hereinafter. The IO decoder 22 generates a device designating signal in accordance with an address signal comprising low-order 8 bits from $A_0$ to $A_7$ on the address bus at a time when receiving the IO strobe signal IOSTB. When the address signal of the low-order 8 bits is, for example 50H, the IO decoder 22 generates a first buffer designating signal in synchronism with the IO strobe signal. The buffer selecting signal is sent to a latch enable terminal of the first address buffer 32 provided in the address storing device 30. When the address signal is 51H, a second buffer designating signal is applied to a latch enable terminal of the second address buffer 34 provided in the address storing device 30. When the address signal is 52H, an operation control signal is sent to the operation control means 25, and when 53H, a card detecting signal is sent to the card detector 40.

The operation control means 25 comprises an operation control buffer 26 and inverters 27 and 29. A latch enable terminal CK of the operation control buffer 26 is connected to the output of the IO decoder 22 and inputs $D_0$ to $D_7$ are connected to the data bus of the CPU. The operation control signal from the device designating means 20 is applied to the latch enable terminal to latch data $D_0$ to $D_7$ applied through the data bus. Upon the receiving of the operation control signal, a Q-output terminal applies a data enable signal as a control signal to data enable terminals of the first address buffer 32 and the second address buffer 34 through the inverter 27. The data enable signal is further sent to the control signal generator 60. Another Q-output terminal generates a switching signal which is applied to a transistor of a power supply circuit 80 through the inverter 29, thereby applying a supply voltage $V_{CC}$ to the memory card 90.

When the first buffer designating signal from the IO decoder 22 and the data enable signal from the operation control buffer 26 are applied to the first address buffer 32 of the address storing device 30, segment addresses of low-order 8 bits $SA_8$ to $SA_{15}$ are stored in the buffer 32 as high-order byte data for the card address. Similarly, when the second buffer designating signal 51H from the IO decoder 22 is applied to the second address buffer 34, segment addresses of high-order 8 bits $SA_{16}$ to $SA_{23}$ are stored in the second address buffer 34 as the segment data for the card address.

The addressing means 15 has an address buffer 16 which stores low-order 8 bits $A_0$ to $A_7$ of an offset address fed as an address signal through the address bus. The offset address $A_0$ to $A_7$ are directly applied to the memory card 90 as card addresses $CA_0$ to $CA_7$. Address signals $A_8$ to $A_{15}$ of high-order 8 bits are applied to an adder 18 to which the segment address $SA_8$ to $SA_{15}$ and $SA_{16}$ to $SA_{23}$ stored in the address buffers 32 and 34, respectively, are also applied. The segment address $SA_8$ to $SA_{15}$ are added to the offset address data $A_8$ to $A_{15}$, so that card addresses $CA_8$ to $CA_{23}$ representing the physical addresses are obtained and applied to the memory card 90. Thus, it becomes possible to access the area of 64 kilobytes of the memory card 90 in accordance with the offset address outputted of the CPU 10.

Figure 3:
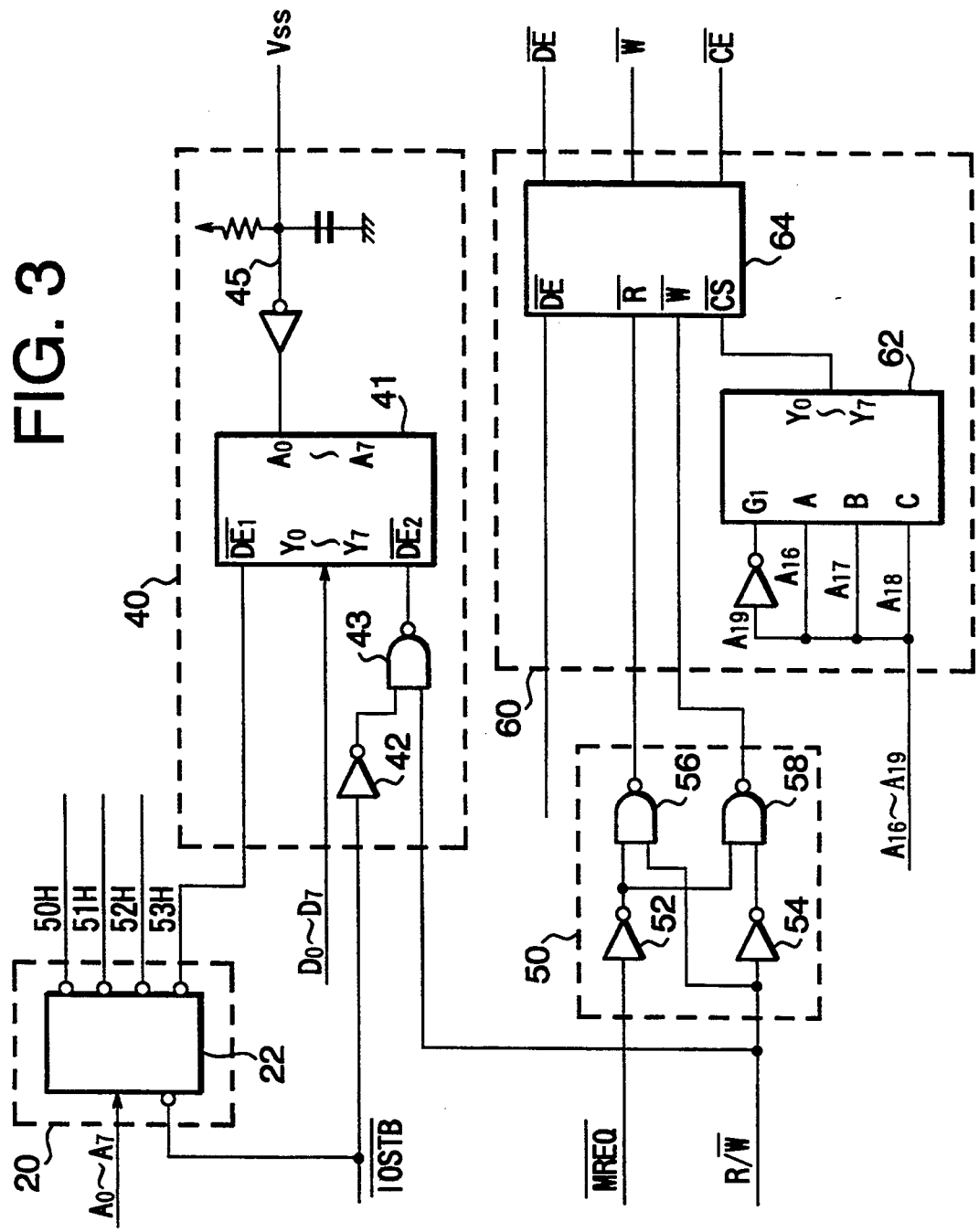
FIG. 3 is a block diagram showing another part of the connecting system of FIG. 1.

Referring to FIG. 3, the card detector 40 has a detection buffer 41, a detecting circuit 45 comprising an inverter, capacitor and a resistor, an inverter 42, and a NAND gate 43. The detection buffer 41 has a first data enable terminal to which the card detecting signal from the device designating means 20 is applied, and a second data enable terminal connected to the output of the NAND gate 43. One of the input terminals of the NAND gate 43 is connected to the IO strobe signal terminal $\overline{IOSTB}$ through the inverter 42, and the other terminal is connected to the read/write signal terminal $R/\overline{W}$. When the memory card 90 is plugged into the computer, a low-level signal is applied from the detector circuit 45 to the buffer 41, thereby storing a data indicating that the memory card is connected. When a high-level read write signal $R/\overline{W}$ is applied to the NAND gate 43 at a time when the IO strobe signal $\overline{IOSTB}$ is not sent to the inverter 42, the NAND gate 43 applies a low-level signal to the second data enable terminal of the buffer 41. If the low-level card detecting signal from the IO decoder 22 of the device designating means 20 is applied at that time, the data latched in the buffer 41 is read by the CPU, so that the setting of the IC memory card can be detected.

The converter 50 comprises a first NAND gate 56 and a second NAND gate 58, one of the input terminals of each of which is connected to the memory request signal terminal $\overline{MREQ}$ of the CPU 10 through an inverter 52. The other input terminals of the first NAND gate 56 is connected to the read/write signal terminal $R/\overline{W}$, and the other input terminal of the second NAND gate 58 is connected to the read/write signal terminal $R/\overline{W}$ through an inverter 54. The converter 50 is adapted to generate either a low-level memory read signal or a high-level memory write signal. More particularly, when a high-level read/write signal $R/\overline{W}$ is applied in the absence of a memory request signal $\overline{MREQ}$, the first NAND gate 56 generates a low level memory read signal. On the other hand, when a low-level read/write signal $R/\overline{W}$ is sent to the inverter 54, the second NAND gate 58 produces a low-level memory write signal.

The memory read signal and the memory write signal are sent to a control signal buffer 64 of the control signal generator 60. The buffer 64 is further applied with the data enable signal from the operation control means 25 as an operation signal. The control signal generator 60 further has a memory decoder 62 having terminals A, B, C and $G_1$ which are applied with respective bits $A_{16}$ to $A_{19}$ of the address signal of the CPU. If the address signal is for example 40000H, the memory decoder 62 produces a low-level chip select signal which is applied to the control signal buffer 64. When the address signal is a value between 40000H and 4FFFFH, the control signal buffer 64 generates a chip enable signal $\overline{CE}$ and a data enable signal $\overline{DE}$ in accordance with the operation signal from the operation control means 25. These enable signals are applied to the memory card 90, thereby enabling to read the data at a designated address in the memory card 90. When the low-level memory write signal is applied to the control signal buffer 64, the chip enable signal $\overline{CE}$ and a memory write signal are fed to the memory card 90, thereby enabling to write data at the designated address.

In operation, the memory card 90 is set in the computer so that the data indicating the existence of the card is latched in the buffer 41. When the CPU 10 applies an address data 53H to the IO decoder 22 of the device designating means 20 through the address bus, the IO decoder 22 in turn applies the card detecting signal as an operation signal to the detection buffer 41 of the card detector 40. When a high-level read/write signal $R/\overline{W}$ is fed from the CPU 10 under the absence of the IO strobe signal $\overline{IOSTB}$, the detection buffer 41 is read to determine that the memory card 90 is set.

Thereafter, the CPU 10 applies the next address data 52H to the IO decoder 22, so that the operation control signal is ed to the operation control means 25. Hence the operation control buffer 26 of the operation control means 25 is latched to operate the system in accordance with the data $D_0$ to $D_7$ applied thereto through the data bus. Namely, a high-level Q-output signal of the buffer 26 is inverted by the inverter 27 and applied to the address storing device 30 and the control signal generator 60 as operation control signals, thereby rendering them operative. At the same time, the operation control buffer 26 applies a low-level signal to the transistor of the power supply circuit 80, so that the transistor becomes conductive, thereby supplying the voltage $V_{CC}$ to the memory card 90.

When the CPU 10 applies address data 50H and 51H, the first and the second address buffers 32 and 34 of the address storing device 30 are applied with the first and the second buffer designating signals 51H and 51H from the IO decoder 22, respectively. The address buffers 32 and 34 accordingly stores the address signal and segment data $SA_8$ to $SA_{15}$, and $SA_{16}$ to $SA_{23}$. The addressing means 15 determines the low-order bits $CA_0$ to $CA_7$ of the physical card address from the offset address data $A_0$ to $A_7$. The high-order bits $CA_8$ to $CA_{23}$ are calculated based on the offset address data $A_8$ to $A_{15}$ and the address signal and segment data $SA_8$ to $SA_{23}$.

The CPU 10 further applies the address data $\overline{40000H}$ to the memory decoder 62 through the address bus, so that a low-level chip select signal is applied to the control signal buffer 64. If a high-level read/write signal $R/\overline{W}$ is applied from the CPU 10 at a time when the memory request signal $\overline{MREQ}$ is not applied, the converter 50 applies a low-level memory read signal to the control signal buffer 64 of the control signal generator 60. Accordingly, the buffer 64 applies the chip enable signal $\overline{CE}$ and the data enable signal $\overline{DE}$ to the memory card 90, thereby enabling to read data at the address designated as $CA_0$ to $CA_{23}$. Thus, the data is transferred to the CPU.

On the other hand, when a low-level read/write signal $R/\overline{W}$ is produced in the absence of the memory request signal $\overline{MREQ}$, the converter 50 applies the low-level memory write signal to the control signal buffer 64. Thus, the memory write signal is fed to the memory card 90 so that the data is written at the designated address of the memory card 90.

If the memory card 90 is provided with a prestoring sector, FAT (file allocation table), directory and a data area of 64 kilobytes in accordance with the MS-DOS format, the directory is read and displayed by the computer. The necessary data such as a program can be selected by looking up the directory. The data in the memory card is accessed when the CPU 10 operates to try to designate the address of the own main memory of the computer. Thus, instructions and other data may be analyzed and processed by the computer.

From the foregoing, it will be understood that in the system according to the present invention, data in the memory card are directly transferred without being stored in a main memory of the computer beforehand. Hence a CPU of the computer is prevented from overwork, and the rise time of a program such as a user program which is stored in the memory card can be shortened. Since various programs can be used without increasing the capacity of the main memory, the power consumption and the manufacturing cost of the computer can be reduced.

While the invention has been described in conjunction with preferred specific embodiment thereof, it will be understood that this description is intended to illustrate and not limit the scope of the invention, which is defined by the following claims.

What is claimed is:

1. A system for controlling transmission data between an IC memory card and a central processing unit (CPU) of a computer comprising:
   device designating means responsive to a designating instruction from the CPU for generating a plurality of device designating signals;
   operation control means, responsive to one of said device designating signals, for latching data applied from the CPU and for producing operation control signals dependent upon said latched data;
   address storing means responsive to another of said device designating signals for storing a plurality of data applied from the CPU as segment data, and responsive to one of said operation control signals for producing a plurality of said stored segment data;
   addressing means for arithmetically adding said segment data applied from said address storing means to high order bit signals of an offset address from the CPU to produce added address data, and for combining said added address data with low order bit signals of said offset address to produce an IC memory card address, whereby said addressing means produces a greater number of IC memory card addresses than a maximum value of said offset address;
   converter means responsive to memory instructions from the CPU for generating a memory read signal and a memory write signal;
   control signal generator means responsive to one of said operation control signals for applying IC memory card control signals to an IC memory card in response to said memory read signal, said memory write signal, and an access instruction from the CPU; and
   data buffer means for allowing a bidirectional transmission of data between the IC memory card and the CPU.

2. A system for controlling transmission data in accordance with claim 1, wherein said designating instruction and said access instruction are signals selected from the address signals of the CPU, respectively.

3. A system for controlling transmission data in accordance with claim 1, wherein the memory instructions applied to the converter means include a memory request signal and a read/write signal of the CPU.

4. A system for controlling transmission data in accordance with claim 1, wherein the operation control means includes an operation control buffer.

5. A system for controlling transmission data in accordance with claim 1, wherein the control signal generator means comprises a memory decoder responsive to an instruction of the CPU and a control signal buffer responsive to an output of the memory decoder and the operation signal for generating a chip enable signal, a data enable signal and a write signal.

6. A system for controlling transmission data in accordance with claim 1, the converter means comprises a logical gate circuit.

7. A system for controlling transmission data in accordance with claim 1, wherein said designating instruction includes a strobe and address signal.

8. A system for controlling transmission data in accordance with claim 1, wherein said IC memory card control signals include a chip enable signal and a data enable signal.

9. A system for controlling transmission data in accordance with claim 1, wherein said IC memory card control signals include a chip enable signal and a write signal.

10. A system for controlling transmission data in accordance with claim 1, further including detector means for detecting the connection of an IC memory card and for indicating the connection of an IC memory card to the CPU.

11. A system for controlling transmission data in accordance with claim 1, further including power supply means for supplying electric energy to the IC memory card.

12. A system for controlling transmission data between an IC memory card and a central processing unit (CPU) of a computer comprising:
  device designating means responsive to a designating instruction from the CPU for generating a device designating signal;
  address storing means responsive to said device designating signals for storing a plurality of data applied from the CPU as segment data, and for producing a plurality of said stored segment data;
  addressing means for arithmetically adding said segment data applied from said address storing means to high order bit signals of an offset address from the CPU to produce added address data, and for combining said added address data with low order bit signals of said offset address to produce an IC memory card address, whereby said addressing means produces a greater number of IC memory card addresses than a maximum value of said offset address;
  converter means responsive to memory instructions from the CPU for regenerating a memory read signal and a memory write signal; and
  control signal generator means for applying IC memory card control signals to an IC memory card in response to said memory read signal, said memory write signal, and an access instruction from the CPU.

13. A system for controlling transmission data in accordance with claim 12, wherein said designating instruction and said access instruction are signals selected from the address signals of the CPU, respectively.

14. A system for controlling transmission data in accordance with claim 12, wherein the memory instructions applied to the converter means include a memory request signal and a read/write signal of the CPU.

15. A system for controlling transmission data in accordance with claim 12, wherein the control signal generator means comprises a memory decoder responsive to an instruction of the CPU and a control signal buffer responsive to an output of the memory decoder and the operation signal for generating a chip enable signal, a data enable signal and a write signal.

16. A system for controlling transmission data in accordance with claim 12, the converter means comprises a logical gate circuit.

17. A system for controlling transmission data in accordance with claim 12, wherein said designating instruction includes a strobe and address signal.

18. A system for controlling transmission data in accordance with claim 12, wherein said IC memory card control signals include a chip enable signal and a data enable signal.

19. A system for controlling transmission data in accordance with claim 12, wherein said IC memory card control signals include a chip enable signal and a write signal, instruction includes an strobe and address signal.

20. A system for controlling transmission data in accordance with claim 12, further including detector means for detecting the connection of an IC memory card and for indicating the connection of an IC memory card to the CPU.

* * * * *